(12) United States Patent
Bar et al.

(10) Patent No.: US 6,456,852 B2
(45) Date of Patent: Sep. 24, 2002

(54) INTERNET DISTRIBUTED REAL-TIME WIRELESS LOCATION DATABASE

(75) Inventors: Abraham Bar, Palo Alto; Ravi Rajapakse, San Francisco; Mati Wax, San Ramon; Oliver A. Hilsenrath, Almo, all of CA (US)

(73) Assignees: Trafficmaster USA, Inc., Garden Grove, CA (US); Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/948,713

(22) Filed: Oct. 10, 1997

Related U.S. Application Data

(63) Continuation-in-part of application No. 08/780,565, filed on Jan. 7, 1997, now Pat. No. 6,026,304.

(51) Int. Cl.[7] .................................................. H04Q 7/20
(52) U.S. Cl. ....................... 455/456; 455/414; 455/457; 342/357.13; 701/208
(58) Field of Search ................................ 455/456, 440, 455/415, 433, 414, 417, 404, 457; 342/387, 457, 357.13; 701/300, 207, 208, 211

(56) References Cited

U.S. PATENT DOCUMENTS

| | | | |
|---|---|---|---|
| 5,327,144 A | * 7/1994 | Stilp et al. | 455/456 |
| 5,512,908 A | 4/1996 | Herrick | 342/387 |
| 5,515,378 A | 5/1996 | Roy, III et al. | 370/95.1 |
| 5,608,410 A | 3/1997 | Stilp et al. | 342/387 |
| 5,959,577 A | * 9/1999 | Fan et al. | 342/357.13 |
| 6,026,304 A | * 2/2000 | Hilsenrath et al. | 455/456 |

* cited by examiner

Primary Examiner—Nay Maung
(74) Attorney, Agent, or Firm—Townsend and Townsend and Crew LLP

(57) ABSTRACT

A system for easily and inexpensively distributing real time location information of cellular telephone users to various third party information subscribers comprises an HTTP server machine which maintains a dynamic database of current cellular users. The database has a list of caller entries, where each entry typically comprises a user ID number, such as a phone number, mobile ID number, and/or handset serial ID. The entry also includes, for each user ID number, a user location identifier such as a latitude and longitude, a sector number, a caller or called phone number and/or a street address. The HTTP server is connected to the internet so that registered third party information subscribers have access to the database by means of standard HTTP protocols that ensure authentication and provide encryption for security. Using caller ID or other means for obtaining a caller's phone number, the third party subscriber can obtain, via a simple internet query, the current location of the caller by submitting the phone number to the HTTP server using an HTML form. Standard software on the central server machine verifies the authenticity of the subscriber, looks up the location information in the database, and returns the information to the subscriber. The subscriber can then use the location information to provide any of a wide range of services to the caller, or to dispatch emergency vehicles to the location of the caller. In addition, the server can directly provide many location-based services to callers.

39 Claims, 2 Drawing Sheets

INTERNET DISTRIBUTED REAL-TIME WIRELESS LOCATION DATABASE

This application is a continuation-in-part of U.S. patent application Ser. No. 08/780,565, filed Jan. 7, 1998, now U.S. Pat. No. 6,026,304, which is incorporated herein by reference.

FIELD OF THE INVENTION

This invention relates generally to cellular telephone network services and management. More specifically, it relates to systems and methods for distributing real-time cellular telephone information in the course of providing location-based services.

BACKGROUND OF THE INVENTION

There are many potential uses of real-time cellular telephone location information. For example, U.S. Pat. No. 5,512,908 to Herrick mentions the application of cellular location information to 911 dispatching, tracking unauthorized cell phone usage, and tracking or locating commercial and/or government vehicles. U.S. Pat. No. 5,327,144 to Stilp et al. also mentions various applications of mobile location information, such as locating lost or stolen vehicles, assisting lost motorists, and dispatching emergency vehicles. These services have not been realized, however, due to several difficulties. First, the conventional methods of location finding, which are based on techniques such as direction finding (DF), time of arrival (TOA), and time difference of arrival (TDOA), cannot accurately and reliably locate transmitters in severe multipath environments. Without reliable location information, it is not possible to provide location based services. A solution to this fundamental problem, however, is disclosed by Hilsenrath et al. in U.S. patent application Ser. No. 08/780,565 now U.S. Pat. No. 6,026,304 which is incorporated herein by reference. Their approach, which takes advantage of multipath signals rather than attempting to mitigate or avoid them, measures a signal signature and determines a location by matching the signature with a calibrated database of signature-location pairs.

Another difficulty facing the realization of location-based services is the expense of communicating the location data to various third party services. In conventional systems, dedicated communication lines are established between the location finding equipment and the third party subscribers in order to transfer the constantly changing location data. Continuously maintaining these lines, especially over long distances, can be very expensive. In addition, if there are many location-based services or many different subscribers, many expensive dedicated lines and/or many differing protocols for communication may need to be devised and deployed to provide the information to each specific location-based service and/or subscriber. The creation and maintenance of these dedicated lines and protocols can be very expensive and inconvenient.

OBJECTS AND ADVANTAGES OF THE INVENTION

Accordingly, it is a primary object of the present invention to provide a method for conveniently and inexpensively communicating location information in real time to third party service providers. It is another object of the invention to provide such a method that is simple to use and allows subscribers to be added and deleted easily and inexpensively. It is another object of the invention to provide for the realization of many cellular network services and management applications that have heretofore been unattainable due to the absence of a simple and inexpensive technique for communicating real-time cellular telephone information to service providers. These and other advantages will become apparent from the following description and accompanying drawings

SUMMARY OF THE INVENTION

The present invention provides a system for easily and inexpensively distributing real time location information of cellular telephone users to various third party information subscribers. A dynamic database of current cellular users is created and is maintained at a central server machine. The database has a list of caller entries, where each entry typically comprises a user ID number, such as a phone number, mobile ID number, and/or handset serial ID. The entry also includes, for each user ID number, a user location identifier such as a latitude and longitude, a sector number, a caller or called phone number and/or a street address. Each entry can include additional information as well, such as a current base station for the user and a most recent registration time of the user.

The database is maintained on an HTTP server connected to the internet. Registered third party information subscribers are given access to the database by means of standard HTTP protocols that ensure authentication and provide encryption for security. Using caller ID or other means for obtaining a caller's phone number, the third party subscriber can obtain, via a simple internet query, the current location of the caller by submitting the phone number to the HTTP server using an HTML form. Standard software on the central server machine verifies the authenticity of the subscriber, looks up the location information in the database, and returns the information to the subscriber. The subscriber can then use the location information to provide any of a wide range of services to the caller, or to dispatch emergency vehicles to the location of the caller. In addition, the server can directly provide many location-based services to callers.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
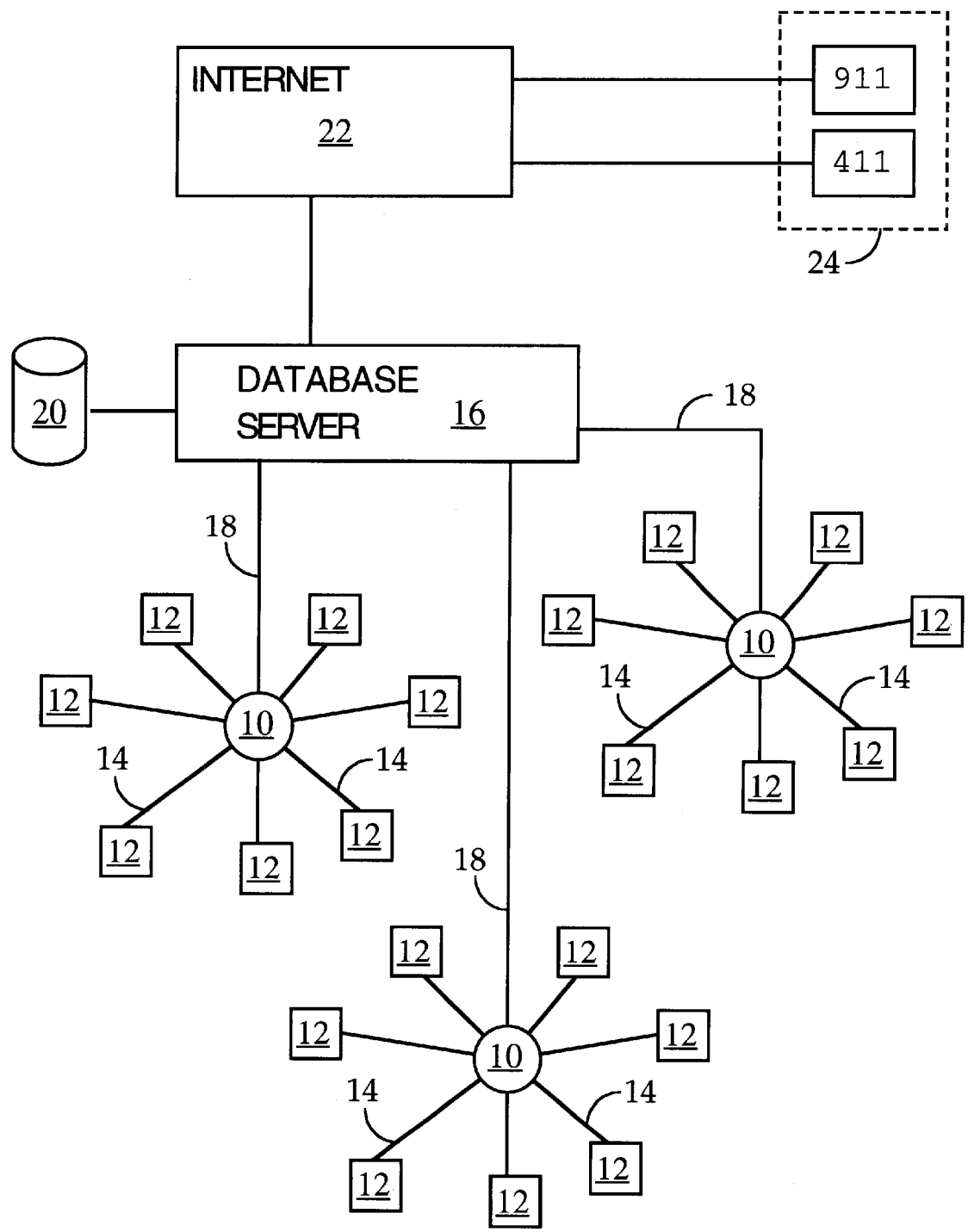
FIG. 1 is a schematic diagram of a system according to the present invention.

A system for carrying out the invention is shown in FIG. 1. Hubs 10 determine transmitter locations from transmitter signal information communicated from base stations 12 to hubs 10 via signature communication lines 14. As pictured, each hub 10 handles several satellite base stations 12 which collectively cover a contiguous geographical region, such as a metropolitan region. Location information determined at hubs 10 is then transmitted to central database server 16 via location communication lines 18. Central server 16 then combines location information from the different hubs 10 into a single location database 20. Database 20 is continuously updated by server 16 to contain the most recent location information. Accordingly, database 20 is a dynamic, real-time database containing the present locations of all transmitters within the geographical regions covered by hubs 10 and their respective satellite base stations 12.

Central server 16 is enabled by conventional hardware and software to act as an HTTP server, and is connected to an internet 22 by standard network hardware and IP protocols. Also connected to internet 22 are various third party subscribers 24 who desire or require location information from database 20 for various uses. For example, cellular caller location information can be used to provide dispatchers with immediate locations for 911 callers under emergency circumstances. Location information also can be used for enhanced 411 service, i.e. for real time caller location associated services, such as providing directions to lost motorists. The location information can be used to provide enhanced 911 response of emergency vehicles by tracking the locations of emergency vehicles, coordinating location information with street map databases, and communicating specific optimal directions to appropriate vehicles. Location information can be used by the cellular phone company for location-based billing of cellular calls and to help combat cellular fraud.

Location information sent from individual base station sites 12 to metro hubs 10 can be used to assist in hand-off between cells, for automatic trunking, for channel borrowing, for channel capacity optimization, to more efficiently allocate cellular frequencies, and to increase the capacity of the metro network. It is a significant feature of the present invention that high bandwidth communication lines are not required to determine and communicate location information within such a network. Accordingly, the present invention enables for the first time the ability to use location information to actively monitor and/or manage all the wireless traffic in a network.

Figure 2:
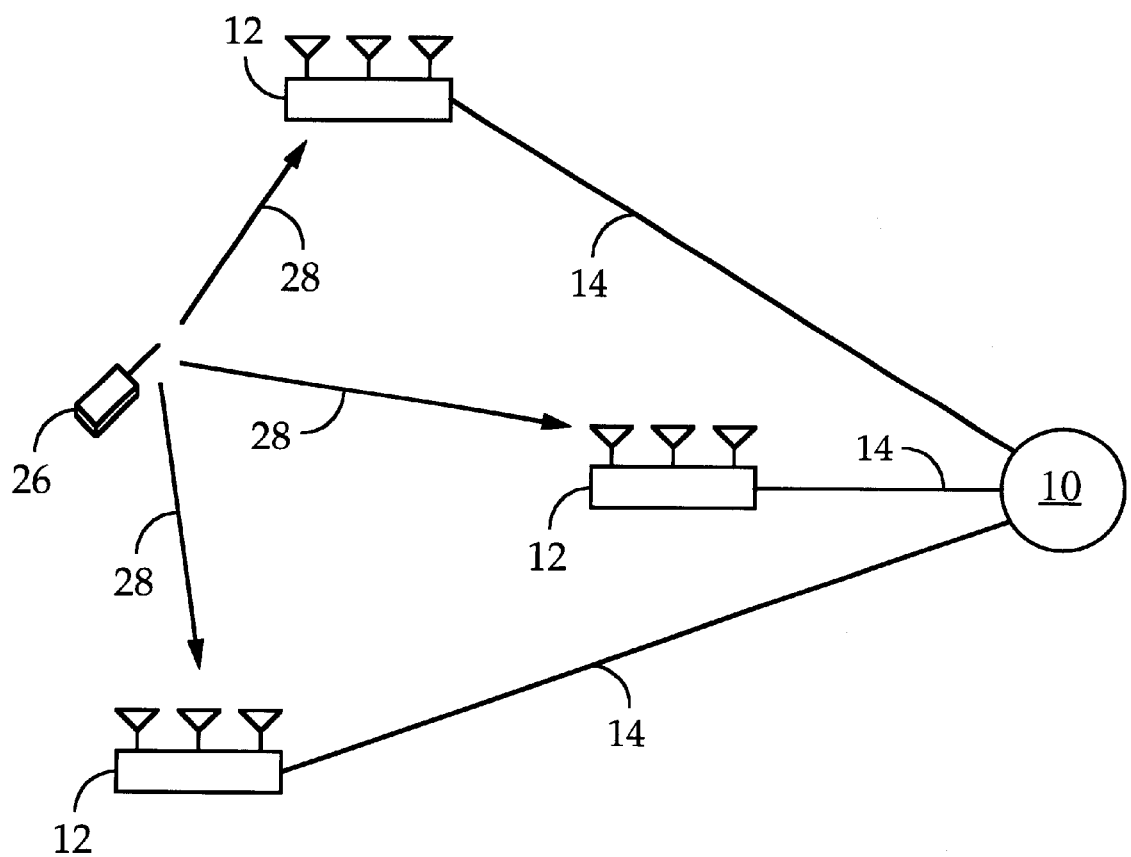
FIG. 2 is a schematic diagram of a location finding subsystem according to the present invention.

FIG. 2 shows a subsystem of the system shown in FIG. 1. A cellular phone 26 transmits signals 28 which are received by one or more location finding base stations 12. Base stations 12 may determine the location of phone 26 by one of, or a combination of, several location finding techniques. In the case where there is not severe multipath, or where accurate location information is not required, any of the conventional methods of location finding may be used. These conventional methods are based on techniques such as direction finding (DF), time of arrival (TOA), and time difference of arrival (TDOA). Typically, signal information is sent from the base stations 12 to the hub 10 for location determination through comparative analysis of the signal information. In the preferred embodiment, the location finding technique disclosed by Hilsenrath et al. in U.S. patent application Ser. No. 08/780,565 now U.S. Pat No. 6,026,304 is used. This technique has the advantage of providing accurate location information even in severe multipath environments. It also has the virtue of being able to determine an accurate location based on signals from just one base station 12. Nevertheless, through the combination of signal information from several base stations 12, an even more accurate location may be determined by hub 10.

In the preferred embodiment, the base stations 12 determine signal signatures and transmit these signatures at periodic intervals to hub 10. Also transmitted are identifiers associated with each signature, such as a handset phone number or a handset ID number. The signatures and identifiers can be transmitted from base stations 12 to hub 10 by various conventional techniques such as a dedicated phone line, a radio frequency channel, or a computer network connection. In the preferred embodiment, the communication links 14 comprise computer network connections. For example, base stations 12 and hub 10 may each have an inexpensive dial-up connection to an internet service provider, and the signature and identifier data is communicated to the hub through this network connection.

At hub 10 the signatures from the base stations 12 are used to determine transmitter locations by matching the signal signatures with calibrated signatures and corresponding locations stored in a database. Specific techniques for performing this matching, as well as techniques for combining information from several base stations to improve accuracy and reduce ambiguity, are disclosed by Hilsenrath et al. in U.S. patent application Ser. No. 08/780,565 now U.S. Pat No. 6,026,304. In an alternate embodiment, each base station 12 performs its own matching to independently determine a location or set of likely locations. This location information is then transmitted to hub 10 instead of, or in addition to, signal signature information.

The location and identifier information at the hubs 10 is sent periodically to the database server 16 over communication links 18 similar to links 14. Although the hubs 10 and server 16 are distinct in this embodiment, the various hubs 10 are not necessarily distinct from each other or from the database server 16. In other words, all the base stations 12 may be directly connected to database server 16, without the use of hubs 10. Database server 16, in this case, performs all the tasks of the hubs 10, as described above.

Irrespective of these system architecture options, however, database server 16 maintains in a memory or other data storage device 20 a dynamic database containing real-time location and identifier data as determined from signals received by base stations 12. More specifically, the database has a list of entries, where each entry typically comprises a user identifier, such as a handset phone number, mobile ID number, and/or handset serial ID. The entry also includes, for each user identifier, a current user location identifier such as a latitude and longitude or other coordinates, a sector number, and/or a street address. Each entry can include additional information as well, such as a current base station for the user, a most recent registration time of the user, and a most recent update time for the user location.

Central server 16 is configured as an HTTP server with a dedicated connection to the internet 22. Registered third party information subscribers 24 are given access to the database by means of standard HTTP protocols that ensure subscriber authentication and provide encryption for security. Specifically, the database may be accessed by sending to server 16 an HTTP request to access a URL which makes reference to a cgi-bin executable script. The URL also contains information identifying the user, such as a name or telephone number, whose location is requested. A cgi-bin script located on server 16 determines a user identifier from the user information in the URL, obtains the corresponding real-time location of the user from the database 20, and returns this location information to the subscriber 24 as an HTML document. Techniques for responding to queries via HTTP search requests, as described above, are well known in the art. Server 16 may perform additional functions to enhance security, such as permit HTTP access only from certain preregistered subscribers, and encrypt information transmitted to and from the subscribers. The server 16 may also selectively limit a subscriber's access to information about particular users. Techniques for configuring HTTP servers to perform functions of this nature are well known in the art.

In a typical application of the present invention, a database subscriber 24 uses caller ID or another technique to automatically identify a caller. The third party subscriber can then automatically generate a simple search query containing the caller's identifying information, and submit the query to the HTTP server using an HTML form, as described above. The cgi-bin software on the central server machine then verifies the authenticity of the subscriber, looks up in the database the real time location information corresponding to the caller information, and returns the location information to the subscriber. The subscriber can then use the location information to provide any of a wide range of services to the caller, as previously described above.

Certain privileged subscribers may be permitted to download the entire database of user identifiers and locations. For example, a cellular telephone service provider may use location information to perform a statistical analysis of service use as a function of location. Such analysis may help provide improved service to cellular telephone customers. In this situation it may be especially useful to include additional information in the database, such as the last registration time of the user, the base station of the user, and the channel of the user. Such information can be especially useful to such a privileged subscriber. As noted previously, the server can be configured to make such information selectively available only to specific subscribers.

In addition to third-party subscribers, the central server may also be accessed by the users themselves. For example, an organization may find it desirable to have real-time access to the locations of various organization members who are provided with cellular phones and regularly engaged in movement. The organization can access the central server 16 in order to obtain location information of its members. A member can call in to the organizational office, for example, to check in after a task has been completed. The office can then verify the member's location. Note that the automatic registration protocol in certain cellular standards allows the determination of a phone location even when the phone is not in use. In this case, location information can be provided even for users who are not actively using their phones. The server, therefore, may provide additional services such as generating a map indicating the real time locations of all the members of an organization.

In another application of the present invention, an individual using a portable laptop computer equipped with a wireless modem can connect to an internet service provider and directly access the database of server 16. In this way, the individual's location can be reported directly to the individual. The server may provide various additional location based services to such an individual. For example, the server can provide the user with automatically generated HTML documents containing lists of nearby ATM machines, nearby restaurants, nearby gas stations, or other places of interest. The server can also provide the individual with a detailed road map of the nearby area, indicating on the map the individual's present location. If the user is not equipped with a laptop computer and wireless modem, similar services may be provided through the use of voice recognition and speech synthesis techniques. For example, the user may dial in to a telephone line connected to the server, and the server can provide voice options to the user, e.g. "for the location of gas stations near you, press 1; for the location of ATM machines near you, press 2." These options may be user-configurable. Using conventional speech recognition techniques, the user can respond to these options by simply saying "one" rather than using the touch-tone keypad of the telephone handset. These features may also be performed by a third-party subscriber rather than by the central server itself. In this case, the third party subscriber performs all the voice recognition and. speech synthesis interfaces, customization features, etc., while the central server provides the location information to the subscriber via the internet, as discussed above.

In another application of the invention, information or advertisements can be provided to the user based on a present location and/or the user's personal profile. For example, a user who is known to be interested in the theatre can be alerted to the production of a play by a small theatre company in the vicinity of the user, or a user who is known to be interested in consumer electronics can be alerted to a sale taking place that day at a nearby retailer. The user can be alerted to this information upon placing a call in a specific region. The central server, which can maintain a database of such events and their localities, can match a user's interest profile and location with appropriate events and alert the user when a call is placed. In addition, or as an alternative, the server can "push" the information to the user by actively placing an automated phone call to the user upon entering the local area of a matching event. For example, if a user is interested in local traffic or weather conditions, the server can be configured to automatically place a call to the user upon entering a local area where a traffic or weather advisory is in effect. As noted above, through the use of the periodic registration protocols of A certain cellular standards, the server can determine the location of a user even when no call is being made.

In a further application of the present invention, the server can be configured by the user to automatically take specific actions based on the location of the user. For example, the user may program the system to send a voice mail, an e-mail, or place an automated phone call to a predetermined number when the user arrives or leaves from a certain location. Specifically, a user might program the server to make a call to a home phone number to alert family members of the user's arrival. Or the server might be programmed to alert a central office when a delivery person has arrived at a delivery location. Clearly, there are many other similar applications of the present invention.

Third party subscribers may use various techniques to identify callers. The widespread caller-ID feature of most telephone systems can be integrated into a subscriber's system to automatically identify a caller. Another technique for automatic identification of callers is to compare the voice signal of the caller with voice signals captured at the bases 12. By matching the caller's voice with one of the captured voice signals, the caller can be identified automatically. Alternatively, a caller can manually identify himself or herself by typing in a code number on the telephone keypad.

It will be apparent from the foregoing examples that many variations and alterations to the details are possible without departing from the general spirit and scope of the invention.

What is claimed is:

1. A method for providing real-time location based services, the method comprising:

collecting signals from each of a plurality of mobile transmitters at one or more base stations;

determining from the received signals a plurality of corresponding transmitter locations by matching the received signals from each of said plurality of mobile transmitters with one or more of a plurality of stored signals, the stored signals representing a plurality of specific locations;

storing the transmitter locations in a database at a server machine; and providing a subscriber with access to the databases via a computer network connection.

2. The method of claim 1 wherein the providing step further comprises the steps of:
   said subscriber sending an HTTP query via an internet connection to said database at said server machine; and
   said server machine sending a response to said HTTP query back to said subscriber via said internet connection.

3. The method of claim 1 wherein the providing step comprises adjusting the accessibility to portions of the database in dependence upon the subscriber.

4. The method of claim 1 wherein the storing step further comprises storing user identifiers in the database.

5. The method of claim 1 further comprising generating at the server customized information based on the transmitter locations, and providing the customized information to the subscriber.

6. The method of claim 1 further comprising performing at the server a preprogrammed action based on the transmitter locations.

7. The method as recited in claim 1, wherein a first one of said one or more base stations generates location information for one of said plurality of mobile transmitters and a second one of said one or more base stations generates location information for said one of said plurality of mobile transmitters, and wherein said location information from said first one of said one or more base stations is compared to said location information from said second one of said one or more base stations to obtain a more accurate location for said one of said plurality of mobile transmitters.

8. The method as recited in claim 7, wherein the determining step further comprises the step of matching the received signals from each of said plurality of mobile transmitters with one or more stored signals associated with a particular location.

9. The method as recited in claim 7, wherein a first one of said one or more base stations generates location information for one of said plurality of mobile transmitters and a second one of said one or more base stations generates location information for said one of said plurality of mobile transmitters, and wherein said location information from said first one of said one or more base stations is compared to said location information from said second one of said one or more base stations to obtain a more accurate location for said one of said plurality of mobile transmitters.

10. The system of claim 1, wherein the mobile transmitters are wireless telecommunications devices and the real-time location based services are 911 emergency services provided by the subscriber to users of the devices.

11. The system of claim 1, wherein the mobile transmitters are wireless telecommunications devices and the real-time location based services are enhanced 411 caller location services provided by the subscriber to users of the devices.

12. A system comprising:
   a plurality of base stations, each of which comprises means for receiving signals from a plurality of mobile transmitters, and means for comparing the received signals with one or more of a plurality of stored signals in order to determine locations corresponding to each of said plurality of mobile transmitters, the stored signals representing a plurality of specific locations; and
   a server machine comprising means for receiving from the base stations the transmitter locations, means for storing the transmitter locations in a database, and means for providing a subscriber with access to the database via a data network connection.

13. The system of claim 12 wherein the server comprises means for responding to subscriber HTTP queries via an internet connection.

14. The system of claim 12 wherein the server comprises means for adjusting the accessibility to portions of the database in dependence upon the subscriber.

15. The system of claim 12 wherein the database further contains user identifiers.

16. The system of claim 12 further comprising means for generating at the server customized information based on the transmitter locations, and means for providing the customized information to the subscriber.

17. The system of claim 12 further comprising means for performing at the server a preprogrammed action based on the transmitter locations.

18. The system as recited in claim 12, wherein a first one of said plurality of base stations generates location information for one of said plurality of mobile transmitters and a second one of said one or more base stations generates location information for said one of said plurality of mobile transmitters, and wherein said location information from said first one of said one or more base stations is compared to said location information from said second one of said one or more base stations to obtain a more accurate location for said one of said plurality of mobile transmitters.

19. A method for providing real-time location based services, comprising the steps of:
   collecting signals from each of a plurality of mobile transmitters at one or more base stations;
   determining the location of said plurality of mobile transmitters from signals received at said one or more base stations, wherein the location of each of said plurality of mobile transmitters is determined from signals received at less than three of said one or more base stations;
   storing the location of said plurality of mobile transmitters in a database at a server machine; and
   providing a subscriber with access to the databases via a computer network connection.

20. A method for providing real-time location based services to a subscriber via a computer network, comprising the steps of:
   collecting signals from a plurality of mobile transmitters;
   determining from the received signals a plurality of corresponding transmitter locations, by comparing the received signals with a plurality of calibrated stored signals, the calibrated stored signals representing a plurality of specific locations;
   storing the transmitter locations in a database at a server machine;
   said subscriber sending an HTTP query via an internet connection to said database at said server machine; and
   said server machine sending a response to said HTTP query back to said subscriber via said internet connection.

21. The method as recited in claim 20, wherein said subscriber is a third-party subscriber.

22. The method as recited in claim 20, wherein said subscriber is an owner of one of said plurality of mobile transmitters.

23. A method for providing real-time location based services to a subscriber, comprising the steps of:
   collecting signals from a plurality of mobile transmitters;
   determining from the received signals a plurality of corresponding transmitter locations by comparing the collected signals with a plurality of calibrated stored signals, the calibrated stored signals representing a plurality of specific locations;

storing the transmitter locations in a database at a server machine;

generating at the server customized information based on the transmitter locations, and providing the customized information to the subscriber.

24. A system comprising:

a plurality of base stations, each of which comprises means for receiving signals from a plurality of mobile transmitters, and means for determining from the received signals locations corresponding to each of said plurality of mobile transmitters by matching the received signals from said plurality of mobile transmitters with a plurality of stored signals representing a plurality of specific locations; and a server machine comprising means for receiving from the base stations the transmitter locations, means for storing the transmitter locations in a database, and means for providing a subscriber with access to the database via a data network connection.

25. The system as recited in claim 24, wherein a first one of said base stations generates location information for one of said mobile transmitters and a second one of said base stations generates location information for said one of said mobile transmitters, and wherein said location information from said first one of said base stations is compared to said location information from said second one of said base stations to obtain a more accurate location for said one of said mobile transmitters.

26. A system for providing location based services to subscribers, comprising:

a plurality of base stations associated with a hub, the base stations and hub receiving signals from a plurality of mobile transmitters and comparing the received signals with a plurality of matching calibrated signals in order to determine locations corresponding to each of said plurality of mobile transmitters, the matching calibrated signals representing a plurality of specific locations; and a server machine receiving from the base stations and hub the transmitter locations, storing the transmitter locations in a database, and responding to HTTP queries received from subscribers via a data network connection.

27. The system of claim 26, wherein the mobile transmitter signals are received at the base stations and compared at the hub.

28. The system of claim 26, wherein the mobile transmitter signals are received and compared at the base stations and the transmitter locations are received by the server machine through the hub.

29. A system for providing location based services to subscribers, comprising:

a plurality of base stations, each of which comprises means for receiving signals from a plurality of mobile transmitters, and means for determining, from the received signals and a plurality of stored signals representing a plurality of specific locations, a plurality of corresponding transmitter locations; and a server machine comprising means for receiving from the base stations the transmitter locations, means for storing the transmitter locations in a database, means for generating customized information based on the location of the mobile transmitters, and means for providing the customized information to subscribers.

30. The system as recited in claim 29, wherein the subscribers are third-party subscribers.

31. The system as recited in claim 29, wherein the subscribers are owners of said mobile transmitters.

32. The system of claim 29, wherein the means for determining uses less than three received signals from each mobile transmitter to determine the corresponding transmitter location.

33. The system of claim 32, wherein the means for determining uses a single received signal from mobile transmitter to determine the corresponding transmitter location.

34. A method for providing real-time location based services, the method comprising:

collecting signals from each of a plurality of mobile transmitters at one or more base stations;

determining from the collected signals a plurality of corresponding transmitter locations by applying a non-triangulation method using collected signals at less than three base stations and using one or more calibrated stored signals associated with each transmitter location;

storing the transmitter locations in a database at a server machine; and providing a subscriber with access to the databases via a computer network connection.

35. The method of claim 34 wherein the non-triangulation method uses collected signals at a single one of the base stations.

36. The method of claim 35, wherein the non-triangulation method compares a collected signal to one or more calibrated stored signals.

37. A method for providing real-time location based services, comprising the steps of:

collecting signals from each of a plurality of mobile transmitters at one or more base stations;

determining the location of each of said mobile transmitters from signals received at said one or more base stations, wherein the location of each of said mobile transmitters is determined from less than three signals collected from each of said mobile transmitters;

storing the location of said plurality of mobile transmitters in a database at a server machine; and providing a subscriber with access to the databases via a computer network connection.

38. The method of claim 37, wherein the location of each of said mobile transmitters is determined by a single signal collected from each of said mobile transmitters.

39. A method for providing real-time location based services, the method comprising:

collecting signals from each of a plurality of mobile transmitters at one or more base stations;

determining from the received signals a plurality of corresponding transmitter locations by matching the received signals from each of said plurality of mobile transmitters with one or more of a plurality of stored signals, the stored signals representing a plurality of precise locations;

storing the transmitter locations in a database at a server machine; and providing a subscriber with access to the databases via a computer network connection.

* * * * *